(12) United States Patent
Shui et al.

(10) Patent No.: US 12,068,806 B2
(45) Date of Patent: Aug. 20, 2024

(54) INTERFACE CIRCUIT, STRING, AND SYSTEM APPLIED TO POWER LINE COMMUNICATION

(71) Applicant: Huawei Digital Power Technologies Co., Ltd., Shenzhen (CN)

(72) Inventors: Wei Shui, Dongguan (CN); Yang Liu, Wuhan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 241 days.

(21) Appl. No.: 17/704,112

(22) Filed: Mar. 25, 2022

(65) Prior Publication Data

US 2022/0216893 A1 Jul. 7, 2022

Related U.S. Application Data

(63) Continuation of application No. PCT/CN2020/091995, filed on May 25, 2020.

(30) Foreign Application Priority Data

Sep. 29, 2019 (CN) .......................... 201910936910.3

(51) Int. Cl.
*H04B 3/58* (2006.01)
*H04B 3/54* (2006.01)
*H04B 3/56* (2006.01)

(52) U.S. Cl.
CPC ............... *H04B 3/58* (2013.01); *H04B 3/544* (2013.01); *H04B 3/56* (2013.01)

(58) Field of Classification Search
CPC ............. H04B 3/58; H04B 3/544; H04B 3/56
See application file for complete search history.

(56) References Cited

U.S. PATENT DOCUMENTS

| 8,158,877 B2 | 4/2012 | Klein et al. |
| 2011/0273016 A1 | 11/2011 | Adest et al. |
| 2014/0161201 A1* | 6/2014 | Yukizane ............... H04B 3/546 375/257 |

(Continued)

FOREIGN PATENT DOCUMENTS

| CN | 1564473 A | 1/2005 |
| CN | 101621313 A | 1/2010 |

(Continued)

*Primary Examiner* — Freshteh N Aghdam
(74) *Attorney, Agent, or Firm* — Maier & Maier, PLLC

(57) ABSTRACT

An interface circuit, a string, and a system that are applied to power line communication, to lower device specifications, includes: an inverter, an optimizer group, a capacitor, a magnetic ring, power lines, and a signal line. An optimizer in the optimizer group is configured to adjust a size of a direct current output by a photovoltaic module connected to the optimizer. Two ends of the signal line passing through the magnetic ring are connected to the inverter. Two ends of a power line passing through the magnetic ring are respectively connected to the capacitor and the optimizer group. By using the foregoing interface circuit, a high voltage of a direct current output by the optimizer group is prevented from being introduced into the inverter, thereby reducing a specification requirement of a device such as a capacitor.

6 Claims, 10 Drawing Sheets

(56) References Cited

U.S. PATENT DOCUMENTS

| | | | | |
|---|---|---|---|---|
| 2015/0163074 A1* | 6/2015 | Pruett | ........................ | H02J 1/00 |
| | | | | 307/2 |
| 2017/0163311 A1* | 6/2017 | Kahn | ..................... | H04B 3/548 |
| 2018/0337555 A1* | 11/2018 | Braginsky | ......... | H02J 13/00007 |
| 2019/0131793 A1 | 5/2019 | Wang et al. | | |
| 2019/0199282 A1 | 6/2019 | Ochiai et al. | | |

FOREIGN PATENT DOCUMENTS

| | | |
|---|---|---|
| CN | 101950984 A | 1/2011 |
| CN | 101981524 A | 2/2011 |
| CN | 102723394 A | 10/2012 |
| CN | 202617114 U | 12/2012 |
| CN | 204119150 U | 1/2015 |
| CN | 206323214 U | 7/2017 |
| CN | 206452387 U | 8/2017 |
| CN | 107546766 A | 1/2018 |
| CN | 109525282 A | 3/2019 |
| CN | 110798246 A | 2/2020 |
| EP | 2725678 A1 | 4/2014 |
| JP | 201439178 A | 2/2014 |
| JP | 20187382 A | 1/2018 |
| WO | 2013014879 A1 | 1/2013 |

\* cited by examiner

US 12,068,806 B2

INTERFACE CIRCUIT, STRING, AND SYSTEM APPLIED TO POWER LINE COMMUNICATION

CROSS-REFERENCE TO RELATED APPLICATIONS

This application is a continuation of International Application No. PCT/CN2020/091995, filed on May 25, 2020, which claims priority to Chinese Patent Application No. 201910936910.3, filed on Sep. 29, 2019. The disclosures of the aforementioned applications are hereby incorporated by reference in their entireties.

TECHNICAL FIELD

The embodiments relate to the field of power line communication technologies, and in particular, to an interface circuit, a string, and a system that are applied to power line communication.

BACKGROUND

Due to the renewable and clean nature of solar energy, photovoltaic (PV) grid-connected power generation technologies have been rapidly developed. A solar power generation system including components such as an optimizer (also referred to as a shutdown device), an inverter, a PV module, and a power line is one of highly efficient PV grid connection solutions.

FIG. 1 shows a current common solar power generation system, in which a power line is used to connect an inverter to an optimizer and connect one optimizer to another (the optimizers are serially connected and then connected to an inverter), and information transfer (for example, an interaction operation on service query information, command control information, and the like) is performed between the inverter and each of the optimizers (for example, optimizer 1 to optimizer n in FIG. 1) by using power line communication (PLC). The inverter may be considered as a master of the power line communication, and the optimizers may be considered as slaves of the power line communication. Power line communication may also be referred to as power line communication, carrier communication, PLC communication, or the like for short. It is a special communication mode in which voice or data transmission is performed by using a high-voltage power line (usually with 35 kV or at a higher voltage level in the power carrier field), a medium-voltage power line (at a 10 kV voltage level), or a low-voltage power distribution line (a 380/220 V subscriber line) as an information transmission medium.

In other words, PLC communication is essentially a manner of modulating a network signal (also referred to as a PLC signal) to a power line and resolving a network cable layout problem by using an existing power line. An inverter needs to send a PLC signal to or receive a PLC signal from a power line by using a coupling apparatus. At present, the coupling apparatus generally uses a direct capacitor coupling manner, and a main implementation principle of the direct capacitor coupling manner is that the inverter modulates the PLC signal and then directly transmits the PLC signal to the power line by using a capacitor. However, this direct capacitor coupling manner imposes a strict requirement on capacitor selection (for example, an impedance requirement of the PLC signal on the power lines needs to be met, and PLC signal attenuation cannot be excessively severe). In addition, because a maximum voltage difference between two power lines connected to the inverter may reach 1500 V, capacitor selection further needs to meet a requirement of safety specifications to reduce impact on a modulation circuit inside the inverter.

SUMMARY

Embodiments provide an interface circuit, a string, and a system that are applied to power line communication. The interface circuit, the string, an apparatus, and the system that are applied to power line communication are formed in a magnetic ring coupling manner. A high voltage generated on an optimizer group connected to the interface circuit and between direct current positive and negative electrodes is not introduced into a modulation circuit inside an inverter connected to the interface circuit, and only a PLC signal generated on an optimizer enters the modulation circuit inside the inverter through power lines and a signal line (or a PLC signal generated on the modulation circuit inside the inverter enters an optimizer through the signal line and the power lines). This reduces a specification requirement of a device such as a capacitor and improves safety performance.

In view of this, according to a first aspect of the embodiments, a system applied to power line communication is provided, and includes: an inverter, at least one optimizer group, at least one capacitor, a magnetic ring, power lines, and a signal line. A quantity of optimizer groups may be the same as or different from a quantity of capacitors. This is not limited herein. It should be noted that, each of the at least one optimizer group includes one or more optimizers and one or more photovoltaic modules, each optimizer is connected to each photovoltaic module in a one-to-one correspondence and is configured to convert a direct current output by each photovoltaic module into an adjustable direct current, and the one or more optimizers are serially connected to the at least one capacitor through the power lines (for example, if the quantity of optimizer groups is the same as the quantity of capacitors, each optimizer group including one or more optimizers is serially connected to each capacitor in a one-to-one correspondence). Then, the power line connected to either end of the at least one capacitor passes through the magnetic ring, that is, after the optimizers in each optimizer group are serially connected, the optimizer group is connected to two ends of each capacitor through the power lines. Finally, the signal line passes through the magnetic ring and is connected to the inverter. The signal line, the power lines, the magnetic ring, and the capacitor are configured to transmit a PLC signal generated on the inverter and/or at least one optimizer.

In the foregoing embodiments, by using a magnetic ring coupling manner, a high voltage generated on an optimizer group and between direct current positive and negative electrodes is not introduced into the inverter, and only a PLC signal generated on an optimizer enters the inverter through the power lines and the signal line (or a PLC signal generated inside the inverter enters an optimizer through the signal line and the power lines). Therefore, no requirement of a safety specification, a capacitance value, and the like is imposed on a modulation circuit inside the inverter, thereby improving safety performance.

With reference to the first aspect of the embodiments, in a first implementation of the first aspect of the embodiments, the at least one optimizer group in the system includes one optimizer group, and that the power line connected to either end of the at least one capacitor passes through the magnetic ring includes: a power line connected to a direct current positive electrode output end of the optimizer group passes through the magnetic ring.

With reference to the first aspect of the embodiments, in a second implementation of the first aspect of the embodiments, the at least one optimizer group in the system includes one optimizer group, and that the power line connected to either end of the at least one capacitor passes through the magnetic ring includes: a power line connected to a direct current negative electrode output end of the optimizer group passes through the magnetic ring.

In the foregoing embodiments, the system includes only one optimizer group, and the power line connected to the direct current negative electrode output end or the direct current positive electrode output end of the optimizer group passes through the magnetic ring. The foregoing embodiments describe how the power line passes through the magnetic ring when there is only one optimizer group, featuring diversity.

With reference to the first aspect of the embodiments, in a third implementation of the first aspect of the embodiments, the at least one optimizer group in the system includes a plurality of (for example, two or more) optimizer groups, and that the power line connected to either end of the at least one capacitor passes through the magnetic ring includes: a power line connected to a direct current output end positive electrode of each optimizer group passes through the magnetic ring.

With reference to the first aspect of the embodiments, in a fourth implementation of the first aspect of the embodiments, the at least one optimizer group in the system includes a plurality of (for example, two or more) optimizer groups, and that the power line connected to either end of the at least one capacitor passes through the magnetic ring includes: a power line connected to a direct current output end negative electrode of each optimizer group passes through the magnetic ring.

With reference to the first aspect of the embodiments, in a fifth implementation of the first aspect of the embodiments, the at least one optimizer group in the system includes a plurality of (for example, two or more) optimizer groups, and that the power line connected to either end of the at least one capacitor passes through the magnetic ring includes: a power line connected to a direct current output end positive electrode of a first optimizer group and a power line connected to a direct current negative electrode of a second optimizer group pass through the magnetic ring, and the first optimizer group and the second optimizer group are two different optimizer groups in the plurality of optimizer groups.

In the foregoing embodiments, the system includes a plurality of (for example, two or more) optimizer groups. Therefore, the power lines connected to the direct current positive electrode output ends of the optimizer groups all pass through the magnetic ring, or the power lines connected to the direct current negative electrode output ends of the optimizer groups all pass through the magnetic ring, or the power lines connected to the direct current negative electrode output ends or the direct current positive electrode output ends of the optimizer groups pass through the magnetic ring in a mixed manner. The foregoing embodiments describe how the power lines pass through the magnetic ring when there are a plurality of optimizer groups and provide a plurality of manners of passing through the magnetic ring, featuring flexibility and selectivity.

According to a second aspect of the embodiments, an interface circuit applied to power line communication is provided. The interface circuit may include at least one capacitor, a magnetic ring, power lines, and a signal line. The power lines are respectively connected to two ends of the at least one capacitor. A power line port connected to one end of each capacitor forms a first interface, and a power line port connected to the other end of each capacitor forms a second interface. The first interface and the second interface are configured to connect to an optimizer. The power line connected to either end of each capacitor passes through the magnetic ring. In addition, the signal line also passes through the magnetic ring. Two ports of the signal line respectively form a third interface and a fourth interface. The third interface and the fourth interface are configured to connect to an inverter. The interface circuit is configured to transmit a PLC signal generated on an optimizer and/or the inverter.

With reference to the second aspect of the embodiments, in a first implementation of the second aspect of the embodiments, the interface circuit further includes: an inverter connected to the third interface and the fourth interface.

The foregoing embodiments describe the interface circuit applied to power line communication. In this way, a high voltage generated on an optimizer group connected to the interface circuit and between direct current positive and negative electrodes is not introduced into a modulation circuit inside the inverter connected to the interface circuit, and only a PLC signal generated on an optimizer enters the modulation circuit inside the inverter through the power lines and the signal line (or a PLC signal generated on the modulation circuit inside the inverter enters an optimizer through the signal line and the power lines). This reduces a specification requirement of a device such as a capacitor and improves safety performance.

According to a third aspect of the embodiments, a string applied to power line communication is provided. In addition to the interface circuit according to the second aspect of the embodiments, the string further includes at least one optimizer group. Each of the at least one optimizer group includes a plurality of serially-connected optimizers, and two ends of each optimizer group are respectively connected to the first interface and the second interface of the foregoing interface circuit.

With reference to the third aspect of the embodiments, in a first implementation of the third aspect of the embodiments, the string may further include a photovoltaic module connected to each optimizer, and the optimizer is configured to convert a direct current output by the photovoltaic module into an adjustable direct current.

The foregoing implementation describes the string applied to power line communication. Each optimizer group in the string is connected to each capacitor above one to one by using the first interface and the second interface. In this way, a PLC signal generated by an optimizer in each optimizer group can be transmitted by using the power lines, the signal line, the magnetic ring, and the corresponding capacitor.

According to a fourth aspect of the embodiments, an apparatus applied to power line communication is provided. The apparatus includes the string according to either of the third aspect of the embodiments and the first implementation of the third aspect. In addition, the apparatus further includes an inverter, and the inverter may be separately connected to the third interface and the fourth interface. In this case, the power lines, the signal line, the magnetic ring, and the at least one capacitor are configured to transmit a PLC signal generated in the inverter and/or an optimizer. The capacitor exists as a signal channel.

In the foregoing embodiments, by using a magnetic ring coupling manner, a high voltage generated on an optimizer group and between direct current positive and negative electrodes is not introduced into the inverter, and only a PLC signal generated on an optimizer enters the inverter through the power lines and the signal line (or a PLC signal generated inside the inverter enters an optimizer through the signal line and the power lines). This reduces a specification requirement of a device such as a capacitor and improves safety performance.

With reference to the fourth aspect of the embodiments, in a first implementation of the fourth aspect of the embodiments, the at least one optimizer group in the apparatus includes one optimizer group, and that the power line connected to either end of the at least one capacitor passes through the magnetic ring includes: a power line connected to a direct current positive electrode output end of the optimizer group passes through the magnetic ring.

With reference to the fourth aspect of the embodiments, in a second implementation of the fourth aspect of the embodiments, the at least one optimizer group in the apparatus includes one optimizer group, and that the power line connected to either end of the at least one capacitor passes through the magnetic ring includes: a power line connected to a direct current negative electrode output end of the optimizer group passes through the magnetic ring.

In the foregoing embodiments, the apparatus includes only one optimizer group, and the power line connected to the direct current negative electrode output end or the direct current positive electrode output end of the optimizer group passes through the magnetic ring. The foregoing embodiments describe how the power line passes through the magnetic ring when there is only one optimizer group, featuring diversity.

With reference to the fourth aspect of the embodiments, in a third implementation of the fourth aspect of the embodiments, the at least one optimizer group in the apparatus includes a plurality of (for example, two or more) optimizer groups, and that the power line connected to either end of the at least one capacitor passes through the magnetic ring includes: a power line connected to a direct current output end positive electrode of each optimizer group passes through the magnetic ring.

With reference to the fourth aspect of the embodiments, in a fourth implementation of the fourth aspect of the embodiments, the at least one optimizer group in the apparatus includes a plurality of (for example, two or more) optimizer groups, and that the power line connected to either end of the at least one capacitor passes through the magnetic ring includes: a power line connected to a direct current negative electrode of each of the plurality of optimizer groups passes through the magnetic ring.

With reference to the fourth aspect of the embodiments, in a fifth implementation of the fourth aspect of the embodiments, the at least one optimizer group in the apparatus includes a plurality of (for example, two or more) optimizer groups, and that the power line connected to either end of the at least one capacitor passes through the magnetic ring includes: a power line connected to a direct current output end positive electrode of a first optimizer group and a power line connected to a direct current negative electrode of a second optimizer group pass through the magnetic ring, and the first optimizer group and the second optimizer group are two different optimizer groups in the plurality of optimizer groups.

In the foregoing embodiments, the apparatus includes a plurality of (for example, two or more) optimizer groups. Therefore, the power lines connected to the direct current positive electrode output ends of the optimizer groups all pass through the magnetic ring, or the power lines connected to the direct current negative electrode output ends of the optimizer groups all pass through the magnetic ring, or the power lines connected to the direct current negative electrode output ends or the direct current positive electrode output ends of the optimizer groups pass through the magnetic ring in a mixed manner. The foregoing embodiments describe how the power lines pass through the magnetic ring when there are a plurality of optimizer groups and provide a plurality of manners of passing through the magnetic ring, featuring flexibility and selectivity.

According to a fifth aspect of the embodiments, a system applied to power line communication is further provided. The system may include:

an inverter, an optimizer group, a capacitor, a magnetic ring, power lines, and a signal line. Two ends of the signal line passing through the magnetic ring are connected to the inverter, and two ends of a power line passing through the magnetic ring are respectively connected to the capacitor and the optimizer group. The magnetic ring, the signal line, the power lines, and the capacitor are configured to transmit a power line communication PLC signal. The optimizer group includes one optimizer or a plurality of serially-connected optimizers. The optimizer group is configured to connect to a photovoltaic module and adjust a size of a direct current output by the photovoltaic module.

In the foregoing embodiments, by using a magnetic ring coupling manner, a high voltage generated on an optimizer group and between direct current positive and negative electrodes is not introduced into the inverter, and only a PLC signal generated on an optimizer enters the inverter through the power lines and the signal line (or a PLC signal generated inside the inverter enters an optimizer through the signal line and the power lines). This reduces a specification requirement of a device such as a capacitor and improves safety performance.

With reference to the fifth aspect of the embodiments, in a first implementation of the fifth aspect of the embodiments, that two ends of the signal line passing through the magnetic ring are connected to the inverter, and two ends of a power line passing through the magnetic ring are respectively connected to the capacitor and the optimizer group includes: two ends of a first signal line passing through a first magnetic ring are connected to the inverter, and two ends of a first power line passing through the first magnetic ring are respectively connected to a first capacitor and a first optimizer group; and two ends of a second signal line passing through a second magnetic ring are connected to the inverter, and two ends of a second power line passing through the second magnetic ring are respectively connected to the second capacitor and a second optimizer group.

The foregoing embodiments describe, when a plurality of magnetic rings exist, a connection relationship between the optimizer groups, the capacitors, and the plurality of magnetic rings, featuring flexibility.

With reference to the fifth aspect of the embodiments, in a second implementation of the fifth aspect of the embodiments, that two ends of the signal line passing through the magnetic ring are connected to the inverter, and two ends of a power line passing through the magnetic ring are respectively connected to the capacitor and the optimizer group includes: the two ends of the signal line passing through the magnetic ring are connected to the inverter, two ends of a first power line passing through the magnetic ring are respectively connected to the first capacitor and a first optimizer group, and two ends of a second power line passing through the magnetic ring are respectively connected to the second capacitor and a second optimizer group.

The foregoing embodiments describe, when one magnetic ring exists, a connection relationship between the optimizer groups, the capacitors, and the magnetic ring, featuring flexibility.

With reference to the second implementation of the fifth aspect of the embodiments, in a third implementation of the fifth aspect of the embodiments, that two ends of a first power line passing through the magnetic ring are respectively connected to the first capacitor and a first optimizer group, and two ends of a second power line passing through the magnetic ring are respectively connected to the second capacitor and a second optimizer group includes: the first power line is connected to a positive electrode, of the first optimizer group, that outputs a direct current, and the second power line is connected to a negative electrode, of the second optimizer group, that outputs a direct current.

The foregoing embodiments describe, when a plurality of optimizer groups exist, a connection manner between the capacitors and the plurality of optimizer groups, featuring flexibility.

With reference to the second implementation of the fifth aspect of the embodiments, in a fourth implementation of the fifth aspect of the embodiments, that two ends of a first power line passing through the magnetic ring are respectively connected to the first capacitor and a first optimizer group, and two ends of a second power line passing through the magnetic ring are respectively connected to the second capacitor and a second optimizer group includes: the first power line is connected to a positive electrode, of the first optimizer group, that outputs a direct current, and the second power line is connected to a positive electrode, of the second optimizer group, that outputs a direct current; or the first power line is connected to a negative electrode, of the first optimizer group, that outputs a direct current, and the second power line is connected to a negative electrode, of the second optimizer group, that outputs a direct current.

The foregoing embodiments describe, when a plurality of optimizer groups exist, another connection manner between the capacitors and the plurality of optimizer groups, featuring selectivity.

According to a sixth aspect of the embodiments, an interface circuit applied to power line communication is provided. The interface circuit may include a magnetic ring, a signal line, power lines, and a capacitor. A port of a first power line connected to one end of the capacitor forms a first interface, and a port of a second power line connected to the other end of the capacitor forms a second interface. The first power line or the second power line passes through the magnetic ring. Two ends of the signal line passing through the magnetic ring respectively form a third interface and a fourth interface. The first port and the second port are configured to connect to an optimizer. The third interface and the fourth interface are configured to connect to an inverter. The interface circuit is configured to transmit a PLC signal.

The foregoing embodiments describe the interface circuit applied to power line communication. In this way, a high voltage generated on an optimizer group connected to the interface circuit and between direct current positive and negative electrodes is not introduced into a modulation circuit inside the inverter connected to the interface circuit, and only a PLC signal generated on an optimizer enters the modulation circuit inside the inverter through the power lines and the signal line (or a PLC signal generated on the modulation circuit inside the inverter enters an optimizer through the signal line and the power lines). This reduces a specification requirement of a device such as a capacitor and improves safety performance.

According to a seventh aspect of the embodiments, an inverter applied to power line communication is further provided. The inverter may include a magnetic ring, a signal line, power lines, and a capacitor. A power line port connected to one end of the capacitor forms a first interface, and a power line port connected to the other end of the capacitor forms a second interface. The first interface and the second interface are configured to connect to an optimizer. The interface circuit is configured to transmit a PLC signal.

According to an eighth aspect of the embodiments, a string applied to power line communication is further provided. In addition to the interface circuit according to the sixth aspect of the embodiments, the string further includes an optimizer group. The optimizer group includes one optimizer or a plurality of serially-connected optimizers, and two ends of the optimizer group are respectively connected to the first interface and the second interface of the foregoing interface circuit.

With reference to the eighth aspect of the embodiments, in a first implementation of the eighth aspect of the embodiments, the string may further include a photovoltaic module connected to each optimizer, and the optimizer is configured to adjust a size of a direct current output by the photovoltaic module.

The foregoing implementation describes the string applied to power line communication. Each optimizer group in the string is connected to each capacitor above one to one by using the first interface and the second interface. In this way, a PLC signal generated by an optimizer in each optimizer group can be transmitted by using the power lines, the signal line, the magnetic ring, and the corresponding capacitor.

According to a ninth aspect of the embodiments, an apparatus applied to power line communication is further provided. The apparatus includes the string according to either of the eighth aspect of the embodiments and the first implementation of the eighth aspect. In addition, the apparatus further includes an inverter, and the inverter may be separately connected to the third interface and the fourth interface. In this case, the power lines, the signal line, the magnetic ring, and the capacitor are configured to transmit a PLC signal generated in the inverter and/or an optimizer. The capacitor exists as a signal channel.

It can be learned from the foregoing solutions that, an interface circuit applied to power line communication provided in the embodiments includes at least one capacitor, a magnetic ring, power lines, and a signal line. The power lines are respectively connected to two ends of the at least one capacitor. A power line port connected to one end of the at least one capacitor forms a first interface, and a power line port connected to the other end of the at least one capacitor forms a second interface. For example, if one capacitor (referred to as C1) exists, the power lines are respectively connected to two ends of capacitor C1. An interface of a power line at one end is the first interface, and an interface of a power line at the other end is the second interface. For another example, if three capacitors (referred to as C2, C3, and C4) exist, power lines are respectively connected to two ends of the three capacitors. Interfaces of power lines respectively connected to one ends of C2, C3, and C4 each may be referred to as the first interface, and interfaces of power lines respectively connected to the other ends of C2, C3, and C4 each may be referred to as the second interface.

In addition, a power line connected to either end of the at least one capacitor passes through the magnetic ring. Similarly, the signal line also passes through the magnetic ring. Two ports of the signal line respectively form a third interface and a fourth interface. The interface circuit is applied to power line communication. The first interface and the second interface may be further connected to an optimizer group (an optimizer in the optimizer group is connected to a photovoltaic module). The third interface and the fourth interface may be further connected to the inverter, so that the power lines, the signal line, the magnetic ring, and the at least one capacitor may be configured to transmit a PLC signal generated on the optimizer and/or the inverter. In the foregoing embodiments, the interface circuit applied to power line communication is formed in the magnetic ring coupling manner. A high voltage generated on an optimizer group connected to the interface circuit and between direct current positive and negative electrodes is not introduced into the modulation circuit inside the inverter connected to the interface circuit, and only a PLC signal generated on an optimizer enters the modulation circuit inside the inverter through the power lines and the signal line (or a PLC signal generated on the modulation circuit inside the inverter enters an optimizer through the signal line and the power lines). This reduces a specification requirement of a device such as a capacitor and improves safety performance. In addition, costs of an entire solar power generation system are further reduced because only one magnetic ring is used.

DETAILED DESCRIPTION OF THE EMBODIMENTS

Figure 1:
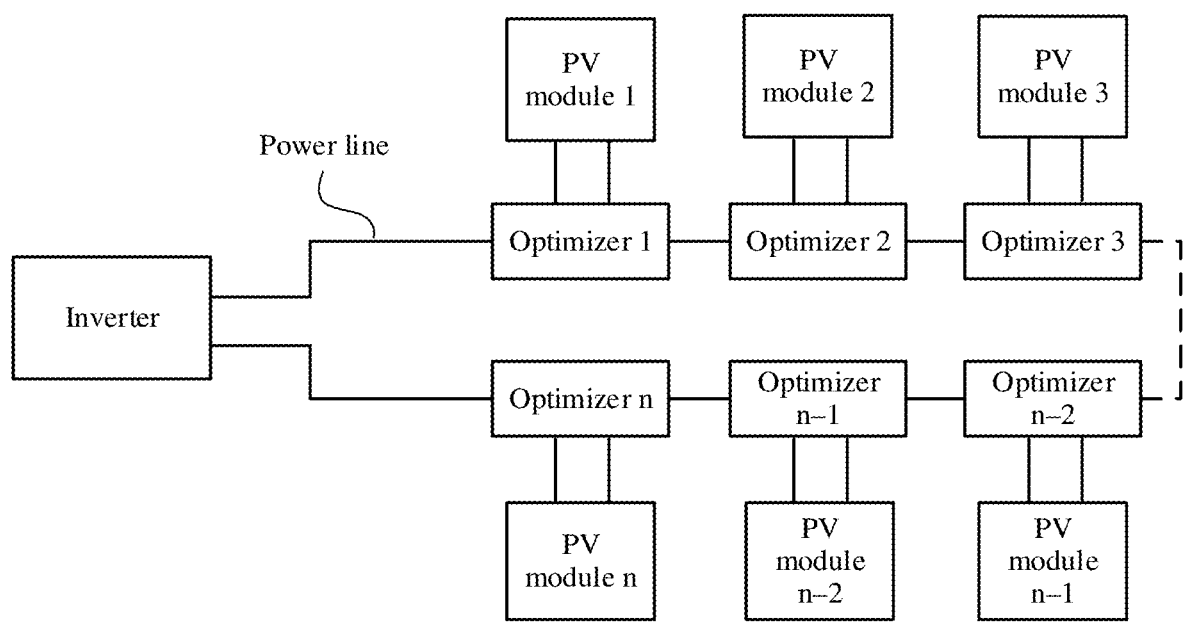
FIG. 1 is a schematic diagram of a current common solar power generation system.

Embodiments provide an interface circuit, a string, and a system that are applied to power line communication. The interface circuit applied to power line communication is formed in a magnetic ring coupling manner. In this way, a high voltage generated on an optimizer group connected to the interface circuit and between direct current positive and negative electrodes is not introduced into a modulation circuit inside an inverter connected to the interface circuit, and only a PLC signal generated on an optimizer enters the modulation circuit inside the inverter through power lines and a signal line (or a PLC signal generated on the modulation circuit inside the inverter enters an optimizer through the signal line and the power lines). This reduces a specification requirement of a device such as a capacitor and improves safety performance. In addition, costs of an entire solar power generation system are further reduced because only one magnetic ring is used.

Before the embodiments are described, concepts that may appear in the embodiments are first described. It should be understood that related concept description may be limited due to circumstances of the embodiments, but this is not limited to only these circumstances, and circumstances of different embodiments may differ. This is not limited herein.

The solar power generation system includes components such as an optimizer (also referred to as a shutdown device), an inverter, a PV module, and power lines. The PV module is a core component and is a system for converting solar energy into electric energy (which is usually a direct current). Because impact of light radiation on the PV module is relatively large, a direct current obtained through conversion is relatively large when light radiation is strong and a radiation time is long (for example, in summer); on the contrary, a direct current obtained through conversion is relatively small when light radiation is weak and a radiation time is short (for example, in a cloudy day). For example, when the PV module is covered by a blocking object, an electric energy yield of the PV module is significantly reduced. In addition, because voltages generated on the power lines after the PV module is serially connected is very high, in a case of a fire or another danger, there needs to be a way to reduce the voltages generated after the PV module is serially connected, so as to protect personal safety. Based on the foregoing description, an optimizer emerges. The optimizer, also referred to as a shutdown device, is a device for converting a direct power generated by the PV module into an adjustable direct current (that is, performing direct current-to-direct current conversion on the direct current output by the PV module to output a direct power with an adjustable voltage and current). The optimizer is configured to dynamically control the direct current generated by the PV module. For example, when the PV module is covered, a PV module (that is, the covered PV module) in a plurality of serially-connected PV modules has unstable output power. If there is no optimizer, current values on the power lines for the serially-connected PV modules are decreased to a current value (that is, a smallest current value) output by the covered PV module, causing a waste of resource. A function of the optimizer is to balance output power of each PV module, so that overall output power on the power lines is stable. In addition, the optimizer may cut off output of a correspondingly connected PV module in an emergency, to reduce a potential safety hazard. The inverter is a direct current-to-alternating current power source, that is, converts the adjustable direct current output by the optimizer into an alternating current. The inverter and the optimizer are connected through the power lines, and the power lines are used to perform information transfer, including an interaction operation on service query information, command control information, and the like.

Figure 2:
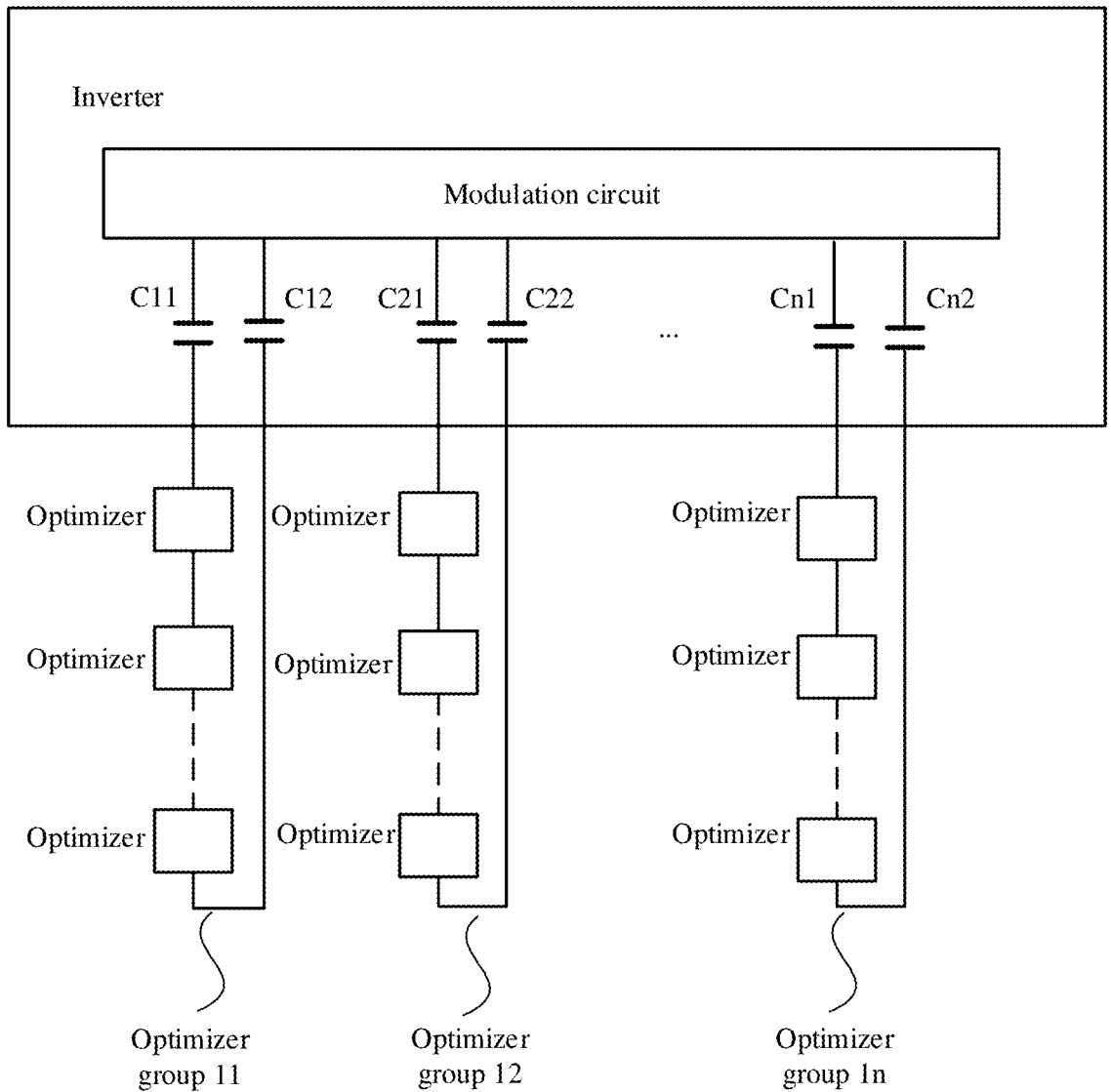
FIG. 2 is a schematic diagram of a direct capacitor coupling manner that is used to transmit a PLC signal and that is commonly used in a solar power generation system.

In addition, a current commonly-used power line communication manner (that is, a direct capacitor coupling manner) in the solar power generation system is further described. A main implementation principle of the direct capacitor coupling manner is that the inverter modulates a PLC signal and then directly transmits the PLC signal to the power lines by using a capacitor. As shown in FIG. 2 (no PV module is shown in FIG. 2), optimizer group 11 formed by serially connecting at least one optimizer (for example, there may be one optimizer or two or more optimizers, which is not limited herein) is separately connected to one ends of two capacitors C11 and C12 (because the PLC signal is a differential signal, there may be only one of capacitors C11 or C12 in some implementations) through the power line, and the other ends of C11 and C12 are connected to the modulation circuit inside the inverter. It should be noted that, a plurality of other optimizer groups (optimizer group 12, . . . , and optimizer group 1n in FIG. 2) similar to optimizer group 11 may be connected to the modulation circuit of the inverter, to implement control of the inverter over the plurality of optimizer groups. However, this direct capacitor coupling manner imposes a strict requirement on capacitor selection (for example, an impedance requirement of the PLC signal on the power lines needs to be met, and PLC signal attenuation cannot be excessively severe). In addition, because a maximum voltage difference between two power lines connected to the inverter may reach 1500 V, this capacitor coupling manner further introduces a high direct-current voltage into the modulation circuit of the inverter (the modulation circuit is configured to send a PLC signal). Therefore, a higher requirement is imposed on a cable layout manner of the modulation circuit of the inverter and component selection, and costs of the modulation circuit inside the inverter are increased. When coupling is required for a plurality of signals (optimizer 11, optimizer group 12, . . . , and optimizer 1n in FIG. 2), a plurality of capacitors used for coupling (capacitors C11, C12, C21, C22, . . . , Cn1, and Cn2 shown in FIG. 2) are further required, and the costs are further increased.

Based on this, to resolve the foregoing problem caused by the capacitor coupling manner, an embodiment first provides a system applied to power line communication. The system includes an inverter, at least one optimizer group, at least one capacitor, a magnetic ring, power lines, and a signal line. A quantity of optimizer groups may be the same as or different from a quantity of capacitors. It should be noted that, each of the at least one optimizer group includes one or more optimizers and one or more photovoltaic modules, each optimizer is connected to each photovoltaic module in a one-to-one correspondence and is configured to convert a direct current output by each photovoltaic module into an adjustable direct current, and the one or more optimizers are serially connected to the at least one capacitor through the power lines (for example, if the quantity of optimizer groups is the same as the quantity of capacitors, each optimizer group including one or more optimizers is serially connected to each capacitor in a one-to-one correspondence). Then, the power line connected to either end of the at least one capacitor passes through the magnetic ring, that is, after the optimizers in each optimizer group are serially connected, the optimizer group is connected to two ends of each capacitor through the power lines. Finally, the signal line passes through the magnetic ring and is connected to the inverter. The signal line, the power lines, the magnetic ring, and the capacitor are configured to transmit a PLC signal generated on the inverter and/or at least one optimizer.

In this embodiment, because there may be one or more optimizer groups, there may be one or more corresponding capacitors. The following separately describes various cases.

Case 1: The system includes one optimizer group and one capacitor.

Figure 3:
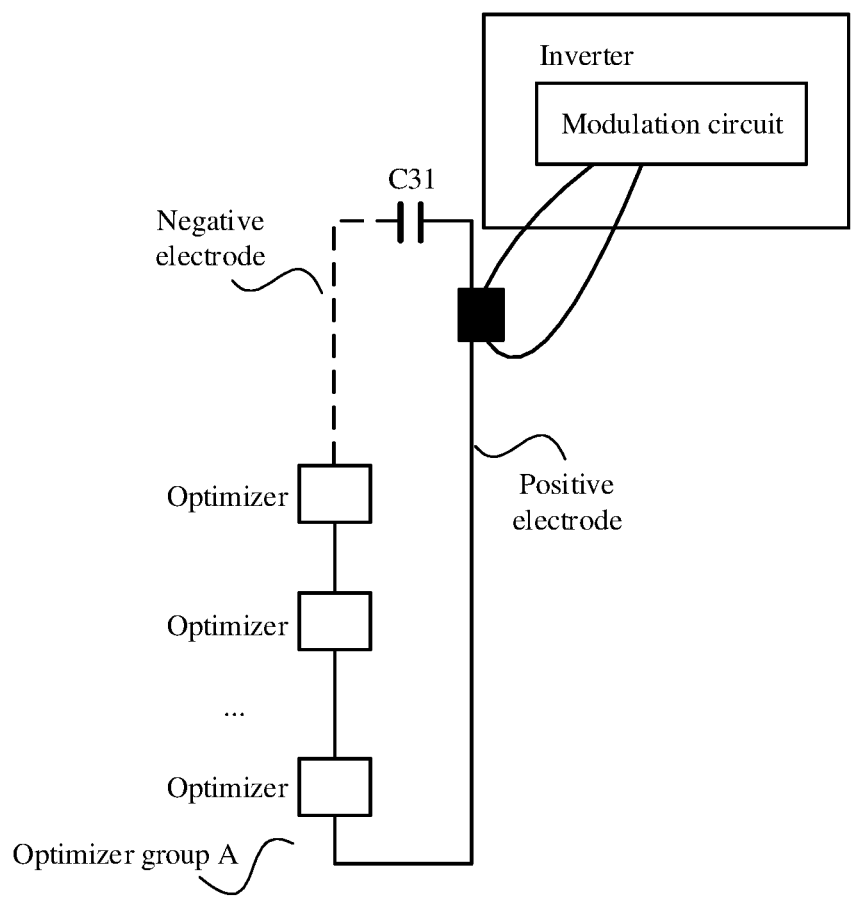
FIG. 3 is a schematic diagram of a system applied to power line communication according to an embodiment.

As shown in FIG. 3, when the system includes only one optimizer group A (optimizer group A includes at least one optimizer, and each optimizer is correspondingly connected to one PV module; and no PV module is shown in FIG. 3), voltages are generated upon connection of optimizer group A to two ends of capacitor C31. In FIG. 3, a power line connected to a direct current positive electrode output end of optimizer group A is denoted by a solid line; and a power line connected to a direct current negative electrode output end of optimizer group A is denoted by a dashed line. In this case, the power line (that is, the solid line) connected to the direct current positive electrode output end of optimizer group A may pass through the magnetic ring, and this is a case shown in FIG. 3. Further, the power line (that is, the dashed line) connected to the direct current negative electrode output end of optimizer group A may pass through the magnetic ring. This is not limited herein.

Case 2: The system includes at least two optimizer groups and at least two capacitors.

Figure 4:
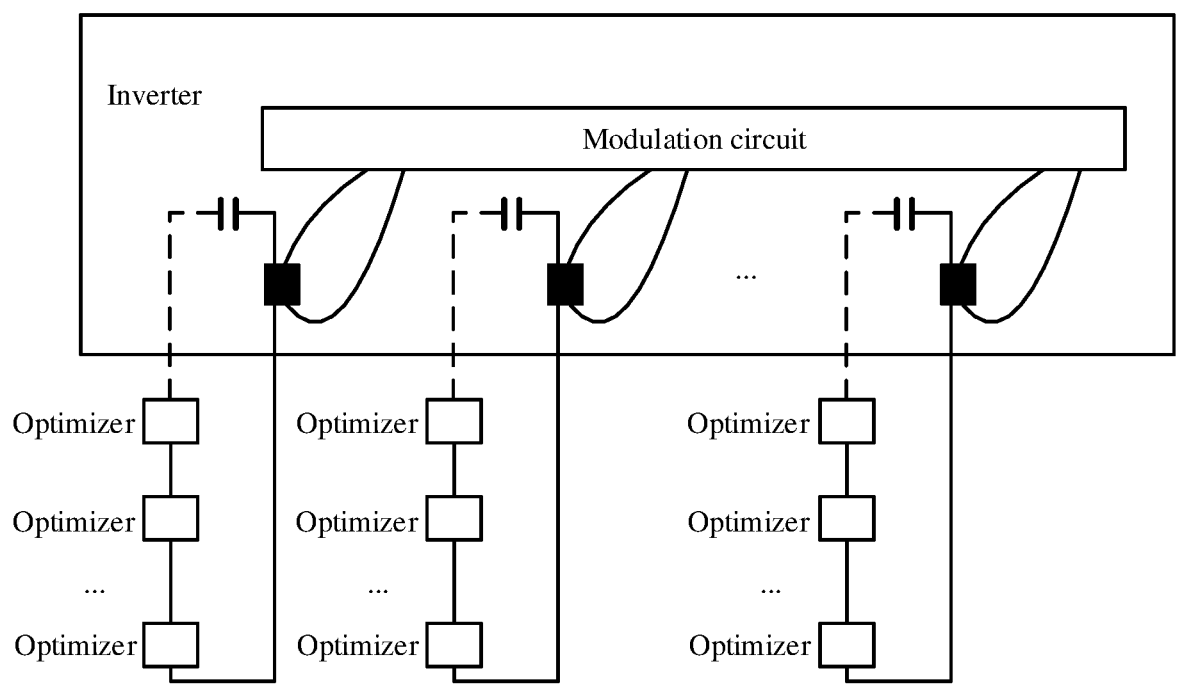
FIG. 4 is another schematic diagram of a system applied to power line communication according to an embodiment.

As shown in FIG. 4, when the system includes a plurality of optimizer groups (two or more optimizer groups, where each optimizer group includes at least one optimizer, and each optimizer is correspondingly connected to one PV module; and no PV module is shown in FIG. 4), each optimizer group may be connected in a connection manner similar to that in FIG. 3, and then connected to the inverter. As shown in FIG. 4, a power line connected to a direct current positive electrode output end of each optimizer group passes through each magnetic ring. Actually, alternatively, a power line connected to a direct current negative electrode output end of each optimizer group may pass through each magnetic ring. Details are not described herein.

Figure 5:
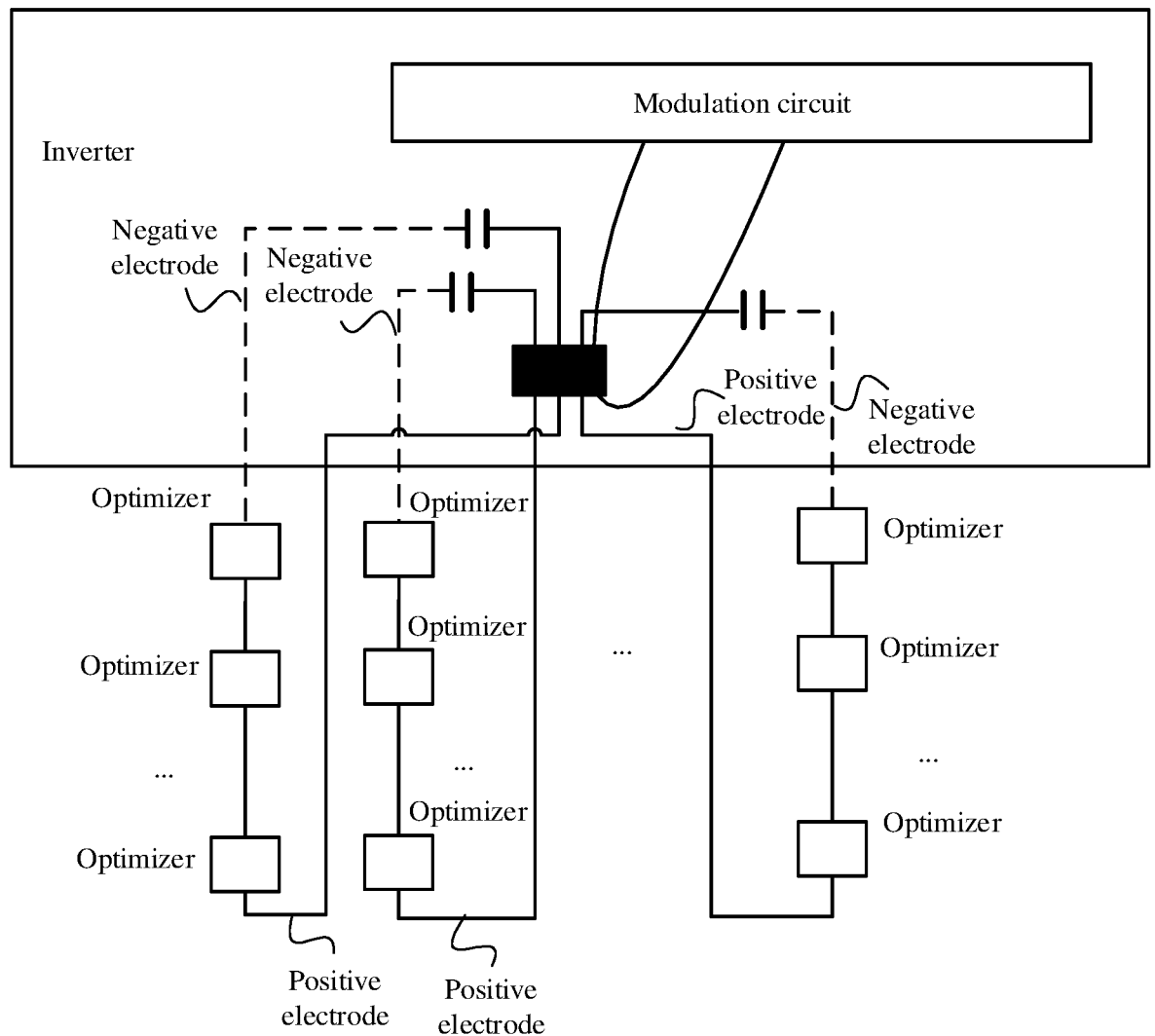
FIG. 5 is another schematic diagram of a system applied to power line communication according to an embodiment.

Moreover, in addition to the manner in FIG. 4, a case in which the system includes at least two optimizer groups and at least two capacitors may alternatively be shown in FIG. 5. When the system shown in FIG. 5 includes at least two optimizer groups (each optimizer group includes at least one optimizer, and each optimizer is correspondingly connected to one PV module; and no PV module is shown in FIG. 5), voltages are generated at two ends of a corresponding capacitor connected to each optimizer group. In FIG. 5, a power line connected to a direct current positive electrode output end of each optimizer group is denoted by a solid line; and a power line connected to a direct current negative electrode output end of each optimizer group is denoted by a dashed line. In this case, the power line (that is, the solid line) connected to the direct current positive electrode output end of each optimizer group may pass through the magnetic ring, and this is a case shown in FIG. 5. This case in FIG. 5 in which at least two optimizer groups are included enables a PLC signal to be coupled to power lines of a plurality of optimizer groups. However, this coupling manner imposes a through-current requirement on the magnetic ring, that is, it is required that impact of a sum of currents on the plurality of optimizer groups does not cause saturation of the magnetic ring.

Figure 6:
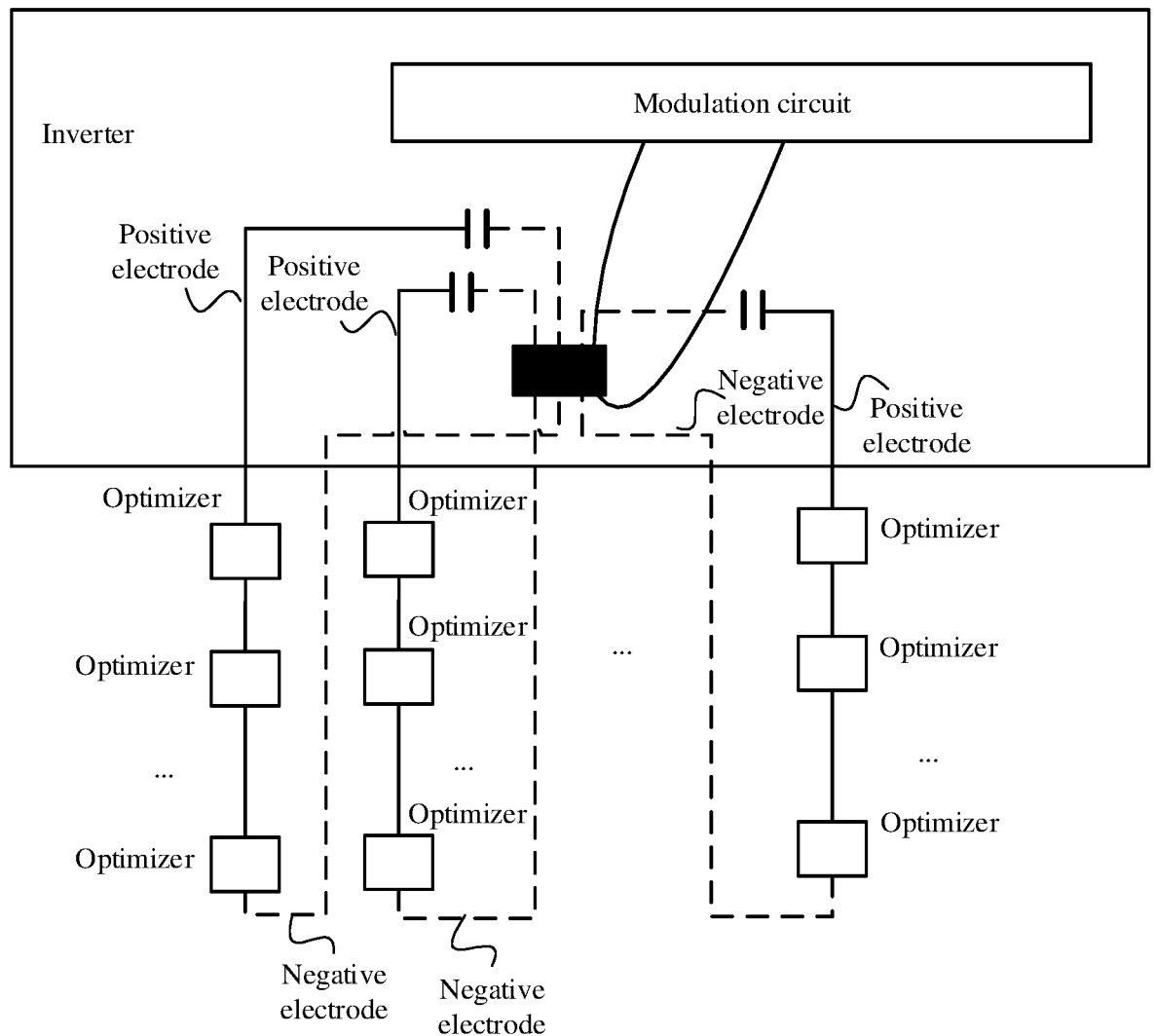
FIG. 6 is another schematic diagram of a system applied to power line communication according to an embodiment.

It should be noted that, in some implementations, alternatively, the power line connected to the direct current negative electrode output end of each optimizer group may pass through the magnetic ring. As shown in FIG. 6, the power line (that is, the dashed line) connected to the direct current negative electrode output end of each optimizer group passes through the magnetic ring.

Figure 7:
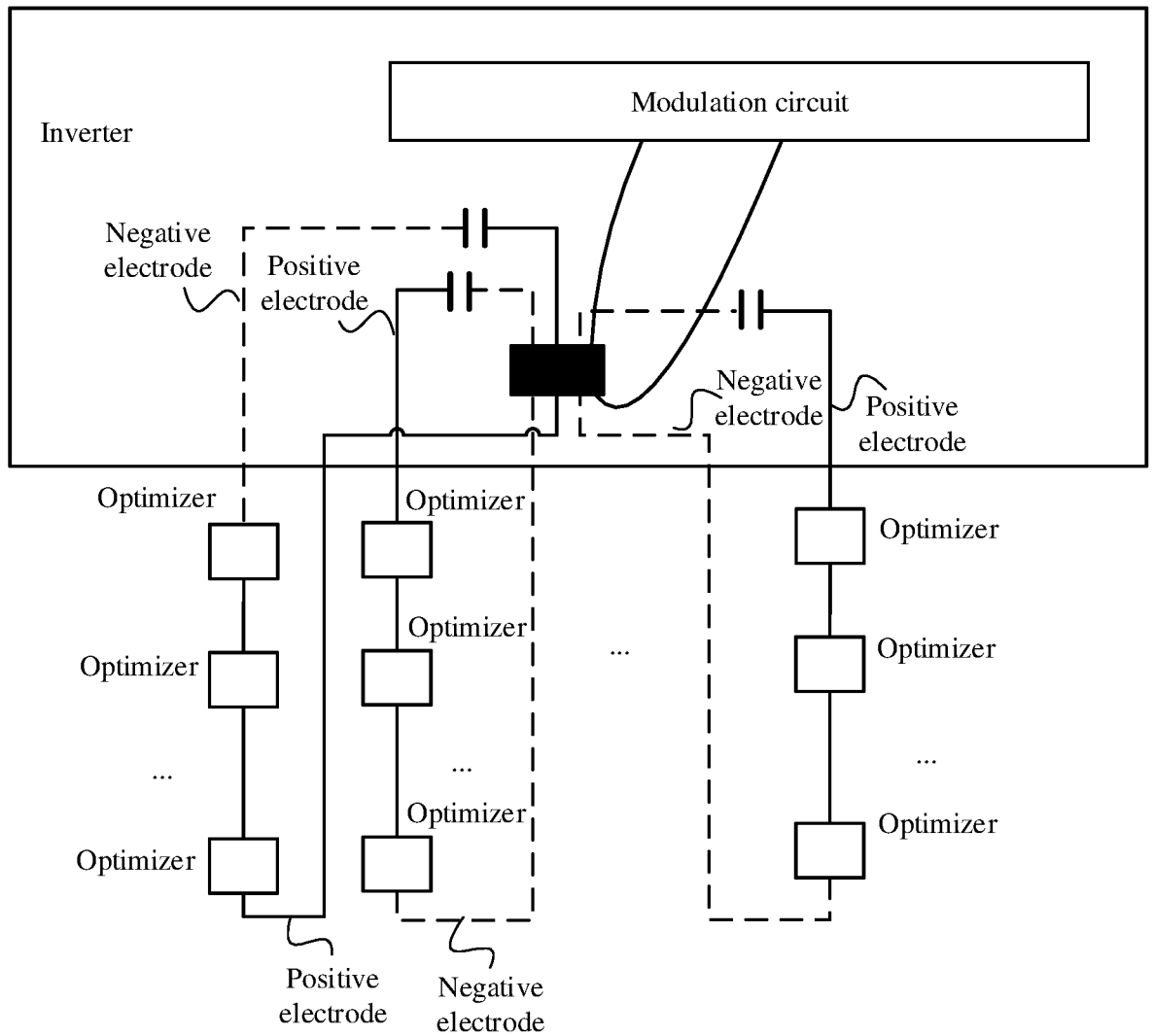
FIG. 7 is another schematic diagram of a system applied to power line communication according to an embodiment.

It should be further noted that, in some implementations, alternatively, a power line connected to a direct current output end positive electrode of a first optimizer group and a power line connected to a direct current negative electrode of a second optimizer group may pass through the magnetic ring. The first optimizer group and the second optimizer group are two different optimizer groups in the plurality of optimizer groups. As shown in FIG. 7 (three optimizer groups are shown), a power line (that is, a solid line) connected to a direct current positive electrode output end of one optimizer group passes through the magnetic ring; and in addition, power lines (that is, dashed lines) connected to direct current negative electrode output ends of two optimizer groups pass through the magnetic ring. In some implementations, alternatively, power lines (that is, solid lines) connected to direct current positive electrode output ends of two optimizer groups may pass through the magnetic ring; and in addition, a power line (that is, a dashed line) connected to a direct current negative electrode output end of one optimizer group passes through the magnetic ring, provided that power lines passing through the magnetic ring include a power line connected to a direct current negative electrode output end of an optimizer group and a power line connected to a direct current positive electrode output end of an optimizer group. This is not limited herein.

The foregoing manner in which a power line connected to a direct current positive electrode output end of an optimizer group or/and a power line connected to a direct current negative electrode output end of an optimizer group passes through the magnetic ring in a mixed manner can reduce a through-current requirement on the magnetic ring. Impact on a through-current of the magnetic ring is resulted from severe magnetic permeability attenuation of the magnetic ring that is caused by a bias of a current. For example, assuming that six optimizer groups in the system need to be connected to the inverter, power lines connected to direct current positive electrode output ends of optimizer groups 1, 2, and 3 and power lines connected to direct current negative electrode output ends of optimizer groups 4, 5, and 6 may pass through the magnetic ring together. Because currents on the power lines connected to the direct current positive electrode output ends of optimizer groups 1, 2, and 3 and currents on the power lines connected to the direct current negative electrode output ends of optimizer groups 4, 5, and 6 have opposite directions, and magnetic fluxes generated respectively by the currents also have opposite directions, the magnetic fluxes cancel each other out when they are superimposed, thereby greatly reducing bias impact on the magnetic ring.

In addition, an embodiment further provides an interface circuit. The interface circuit is applied to power line communication. The interface circuit may include at least one capacitor, a magnetic ring, power lines, and a signal line. As the interface circuit may include different quantities of capacitors, the following describes several cases separately.

1. The interface circuit includes one capacitor, a magnetic ring, power lines, and a signal line.

Figure 8:
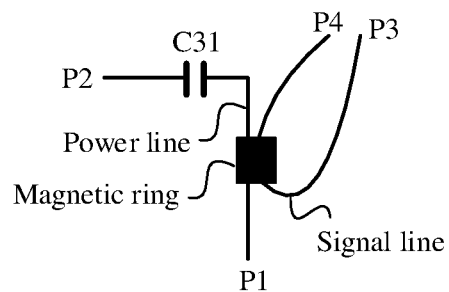
FIG. 8 is a schematic diagram of an interface circuit applied to power line communication according to an embodiment.

If the interface circuit includes only one capacitor C31, a schematic diagram of connections between capacitor C31 and the magnetic ring, the power lines, and the signal line is shown in FIG. 8. The power lines are respectively connected to two ends of capacitor C31. A power line port connected to one end of capacitor C31 forms a first interface P1, and a power line port connected to the other end of capacitor C31 forms a second interface P2. A power line connected to either end of capacitor C31 (a power line forming the first interface P1 is shown in FIG. 8) passes through the magnetic ring. In addition, the signal line also passes through the magnetic ring. One port of the signal line forms a third interface P3, and the other port of the signal line forms a fourth interface P4.

2. The interface circuit includes at least two capacitors, a magnetic ring, power lines, and a signal line.

Figure 9:
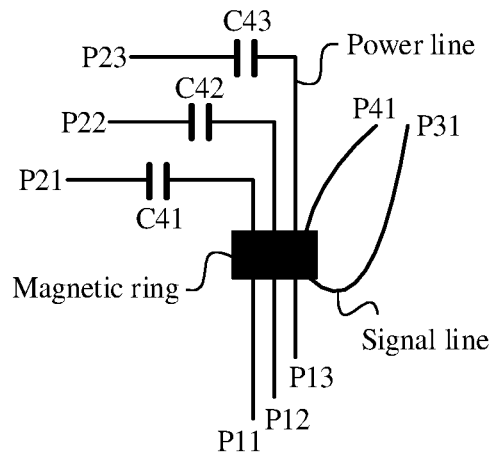
FIG. 9 is another schematic diagram of an interface circuit applied to power line communication according to an embodiment.

If the interface circuit includes at least two capacitors, and an example with three capacitors (which are respectively C41, C42, and C43) is used for description, a schematic diagram of connections between the three capacitors and the magnetic ring, the power lines, and the signal line is shown in FIG. 9. Each of the power lines is separately connected to two ends of each of capacitors C41, C42, and C43. Power line ports connected to one ends of capacitors C41, C42, and C43 form three first interfaces, and the three first interfaces may be respectively referred to as P11, P12, and P13. Power line ports connected to the other ends of capacitors C41, C42, and C43 form three second interfaces, and the three second interfaces may be respectively referred to as P21, P22, and P23. Power lines connected to either ends of capacitors C41, C42, and C43 (power lines forming the three first interfaces P11, P12, and P13 are shown in FIG. 9) pass through the magnetic ring. In addition, the signal line also passes through the magnetic ring. One port of the signal line forms a third interface P31, and the other port of the signal line forms a fourth interface P41.

Figure 10:
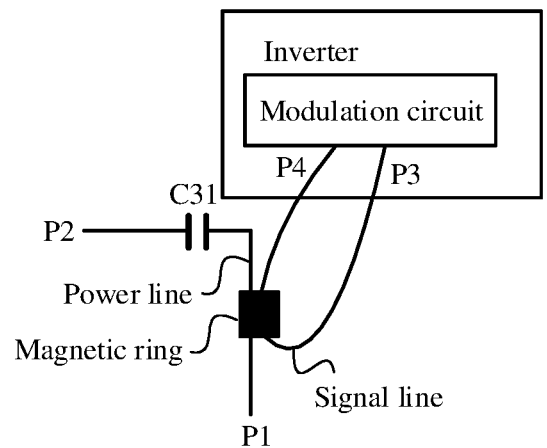
FIG. 10 is another schematic diagram of an interface circuit applied to power line communication according to an embodiment.

It should be noted that, in some implementations, the interface circuit may further include an inverter, and the inverter is connected to the magnetic ring by using the third interface and the fourth interface. Therefore, a PLC signal generated on the inverter can be transmitted by using the power lines, the magnetic ring, and the at least one capacitor of the interface circuit. For ease of understanding, FIG. 10 is used as an example for description. The case in which the interface circuit shown in FIG. 10 includes one capacitor is that the third interface P3 and the fourth interface P4 are connected to a modulation circuit inside the inverter on a basis of the interface circuit shown in FIG. 8. In this way, a PLC signal generated by the modulation circuit inside the inverter can be coupled to the power lines by using the signal line and the magnetic ring. Similarly, if the interface circuit shown in FIG. 9 is used as a basis, the third interface P31 and the fourth interface P41 of the interface circuit are also connected to the modulation circuit inside the inverter in a similar manner. Details are not described herein.

In addition to the interface circuit applied to power line communication, an embodiment further provides a string. The string is also applied to power line communication, and the string may include the interface circuit according to either of FIG. 8 and FIG. 9. In addition, the string further includes at least one optimizer group. A quantity of the at least one optimizer group is the same as a quantity of the at least one capacitor in the foregoing interface circuit. In addition, each of the at least one optimizer group is formed by serially connecting at least one optimizer (the serial connection is performed through the power lines). Each optimizer group is connected to each capacitor described above in a one-to-one correspondence by using the first interface and the second interface. In this way, a PLC signal generated by an optimizer in each optimizer group can be transmitted by using the power lines, the signal line, the magnetic ring, and the corresponding capacitor. As the string may include different quantities of optimizer groups, the following describes several cases separately.

1. The string includes one optimizer group.

Figure 11:
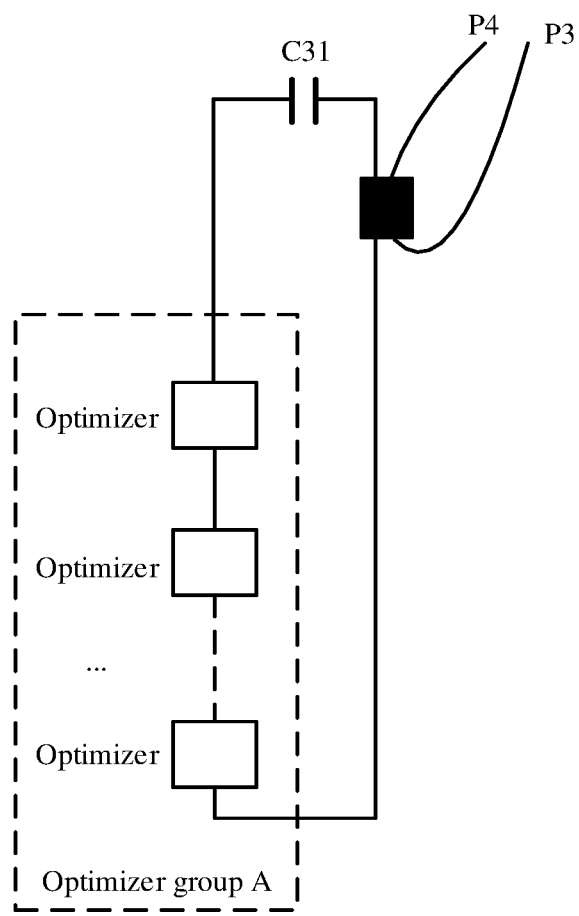
FIG. 11 is a schematic diagram of a string applied to power line communication according to an embodiment.

When the string includes only one optimizer group, the corresponding interface circuit includes only one capacitor. As shown in FIG. 11, after each optimizer in optimizer group A in the string is serially connected by using power lines, the string is connected to capacitor C31 by using the first interface P1 and the second interface P2 (which are not shown in FIG. 11).

2. The string includes at least two optimizer groups.

Figure 12:
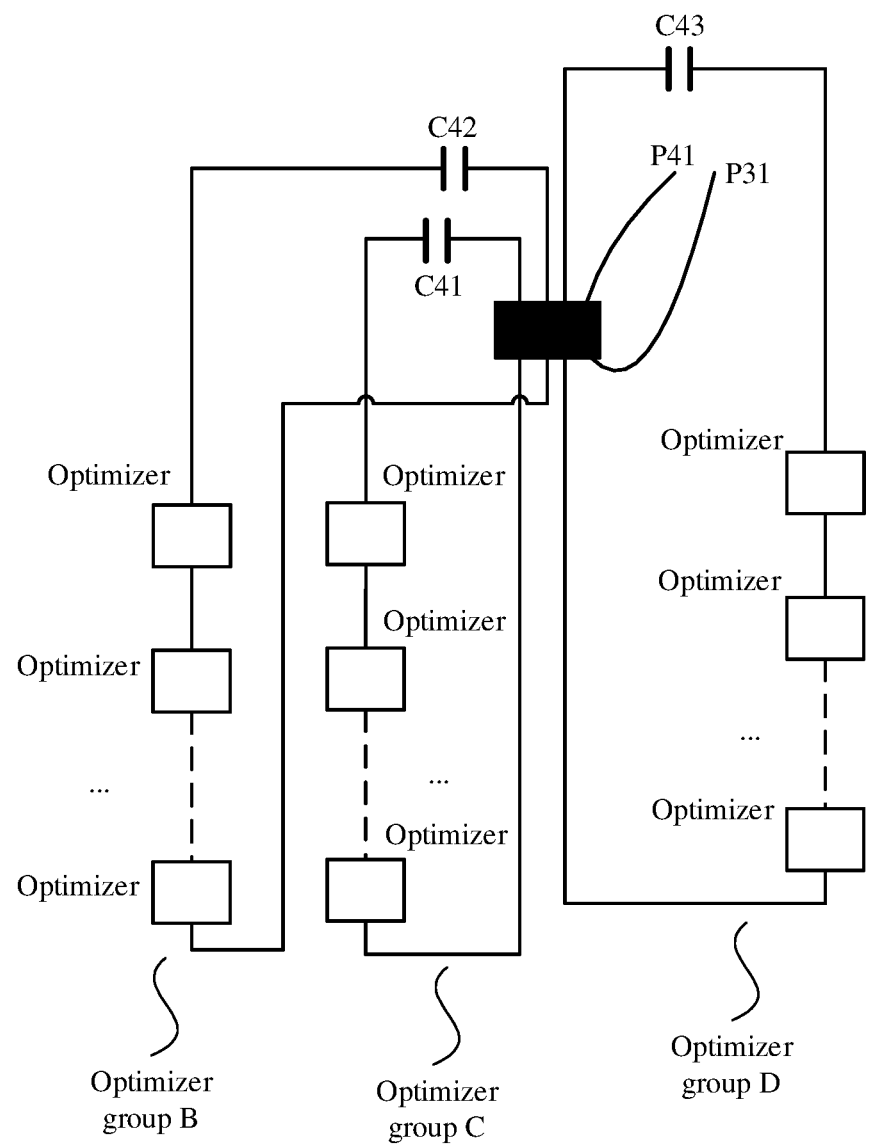
FIG. 12 is another schematic diagram of a string applied to power line communication according to an embodiment.

When the string includes at least two optimizer groups, the corresponding interface circuit includes capacitors whose quantity is the same as the quantity of the optimizer groups. As shown in FIG. 12, an example in which there are three optimizer groups is used for description. The three optimizer groups are respectively referred to as optimizer group B, optimizer group C, and optimizer group D. In this case, there are three corresponding capacitors (as shown in FIG. 9). Optimizer group B, optimizer group C, and optimizer group D are respectively connected to capacitors C41, C42, and C43 shown in FIG. 4 in a one-to-one correspondence (the first interfaces P11, P12, and P13 and the second interfaces P21, P22, and P23 are not shown in FIG. 12).

It should be noted that, in some implementations, the string includes at least one PV module in addition to the at least one optimizer group. A quantity of PV modules is the same as a quantity of all optimizers in the at least one optimizer group. Each PV module is connected to each optimizer in a one-to-one correspondence. That is, one optimizer is connected to one PV module, and is configured to adjust a direct current generated by the corresponding PV module, that is, convert the direct current output by each PV module into an adjustable direct current.

In addition to the interface circuit and the string that are applied to power line communication, an embodiment further provides an apparatus. The apparatus is also applied to power line communication. The apparatus includes at least one string according to either of FIG. 11 and FIG. 12. In addition, the apparatus further includes an inverter. The inverter may be separately connected to the magnetic ring by using the third interface and the fourth interface. In this case, the power lines, the signal line, the magnetic ring, and the at least one capacitor are configured to transmit a PLC signal generated in the inverter and/or an optimizer. The capacitor exists as a signal channel. In this embodiment, there may be one or more strings, and there may be one or more optimizer groups in each string. The following separately describes various cases.

Case 1: The apparatus includes one string, and the string includes one optimizer group.

Similar to FIG. 3, when the apparatus includes only one string, and the string includes only one optimizer group A, voltages are generated upon connection of optimizer group A to two ends of capacitor C31. In FIG. 3, a power line connected to a direct current positive electrode output end of optimizer group A is denoted by a solid line; and a power line connected to a direct current negative electrode output end of optimizer group A is denoted by a dashed line. In this case, the power line (that is, the solid line) connected to the direct current positive electrode output end of optimizer group A may pass through the magnetic ring. Further, the power line (that is, the dashed line) connected to the direct current negative electrode output end of optimizer group A may pass through the magnetic ring. This is not limited herein.

Case 2: The apparatus includes at least two strings, and each string includes one optimizer group.

Similar to FIG. 4, when the apparatus includes a plurality of (two or more) strings, and each string includes only one optimizer group, each string may be connected to the inverter in a connection manner similar to that in FIG. 3, as shown in FIG. 4. It should be noted that, a power line connected to a direct current positive electrode output end of the optimizer group in each string passes through each magnetic ring. Actually, alternatively, a power line in the string that is connected to a direct current negative electrode output end of the optimizer group may pass through each magnetic ring. Details are not described herein.

Case 3: The apparatus includes one string, and the string includes at least two optimizer groups.

Similar to FIG. 5, when the apparatus includes one string, and the string includes at least two optimizer groups, voltages are generated at two ends of a corresponding capacitor connected to each optimizer group. A power line connected to a direct current positive electrode output end of each optimizer group is denoted by a solid line; and a power line connected to a direct current negative electrode output end of each optimizer group is denoted by a dashed line. In this case, the power line (that is, the solid line) in the string that is connected to the direct current positive electrode output end of each optimizer group may pass through the magnetic ring, and this is a case shown in FIG. 5.

This case in which the string includes at least two optimizer groups enables a PLC signal to be coupled to power lines of a plurality of strings. However, this coupling manner imposes a through-current requirement on the magnetic ring, that is, it is required that impact of a sum of currents on the plurality of strings does not cause saturation of the magnetic ring.

It should be noted that, in some implementations, alternatively, the power line in the string that is connected to the direct current negative electrode output end of each optimizer group may pass through the magnetic ring. Similar to FIG. 6, the power line (that is, the dashed line) in the string that is connected to the direct current negative electrode output end of each optimizer group passes through the magnetic ring.

It should be further noted that, in some implementations, as the string includes at least two optimizer groups, alternatively, a power line connected to a direct current output end positive electrode of a first optimizer group and a power line connected to a direct current negative electrode of a second optimizer group may pass through the magnetic ring. The first optimizer group and the second optimizer group are two different optimizer groups in the plurality of optimizer groups. Similar to FIG. 7, a power line (that is, a solid line) in the string that is connected to a direct current positive electrode output end of one optimizer group passes through the magnetic ring; and in addition, power lines (that is, dashed lines) in the string that are connected to direct current negative electrode output ends of two optimizer groups pass through the magnetic ring. In some implementations, alternatively, power lines (that is, solid lines) connected to direct current positive electrode output ends of two optimizer groups may pass through the magnetic ring; and in addition, a power line (that is, a dashed line) connected to a direct current negative electrode output end of one optimizer group passes through the magnetic ring, provided that power lines passing through the magnetic ring include a power line connected to a direct current negative electrode output end of an optimizer group and a power line connected to a direct current positive electrode output end of an optimizer group. This is not limited herein.

The foregoing manner in which a power line connected to a direct current positive electrode output end of an optimizer group or a power line connected to a direct current negative electrode output end of an optimizer group passes through the magnetic ring in a mixed manner can reduce a through-current requirement on the magnetic ring. Impact on a through-current of the magnetic ring is resulted from severe magnetic permeability attenuation of the magnetic ring that is caused by a bias of a current. For example, assuming that six optimizer groups in the string need to be connected to the inverter, power lines connected to direct current positive electrode output ends of optimizer groups 1, 2, and 3 and power lines connected to direct current negative electrode output ends of optimizer groups 4, 5, and 6 may pass through the magnetic ring together. Because currents on the power lines connected to the direct current positive electrode output ends of optimizer groups 1, 2, and 3 and currents on the power lines connected to the direct current negative electrode output ends of optimizer groups 4, 5, and 6 have opposite directions, and magnetic fluxes generated respectively by the currents also have opposite directions, the magnetic fluxes cancel each other out when they are superimposed, thereby greatly reducing bias impact on the magnetic ring.

Case 4: The apparatus includes at least two strings, and each string includes at least two optimizer groups.

When the apparatus includes at least two strings, and each string includes at least two optimizer groups (each optimizer group includes at least one optimizer, and each optimizer is correspondingly connected to one PV module), each string may be connected to the inverter in a connection manner similar to those in FIG. 5 to FIG. 7, to implement control by the inverter over the plurality of optimizer groups in the plurality of strings. Details are not described herein.

In conclusion, the foregoing embodiments are merely intended for describing the solutions, but not for limiting. Although described in detail with reference to the foregoing embodiments, persons of ordinary skill in the art should understand that they may still make modifications to the solutions described in the foregoing embodiments or make equivalent replacements to some features thereof, without departing from the scope of the solutions of the embodiments.

What is claimed is:

1. A system applied to power line communication, comprising:
   an inverter;
   at least one optimizer group, each of the at least one optimizer group comprising one or more optimizers and one or more photovoltaic modules, each optimizer is connected to each photovoltaic module in a one-to-one correspondence and is configured to convert a direct current output by each photovoltaic module into an adjustable direct current,
   at least one capacitor;
   a magnetic ring;
   power lines; and
   a signal line, wherein the at least one optimizer group is serially connected to the at least one capacitor through the power lines, the power lines are connected to either end of the at least one capacitor and pass through the magnetic ring, the signal line passes through the magnetic ring and is connected to the inverter, and the signal line, the power lines, the magnetic ring, and the at least one capacitor are configured to transmit a power line communication (PLC) signal.

2. The system applied to power line communication according to claim 1, wherein the at least one optimizer group comprises one optimizer group, and the power lines comprise:
   a power line connected to a direct current output end of the at least one optimizer group that passes through the magnetic ring.

3. The system applied to power line communication according to claim 1, wherein the at least one optimizer group comprises one optimizer group, and the power lines comprise:
   a power line connected to a direct current output end of the at least one optimizer group that passes through the magnetic ring.

4. The system applied to power line communication according to claim 1, wherein the at least one optimizer group comprises a plurality of optimizer groups and the power lines comprises:
   a power line connected to a direct current positive electrode output end of each optimizer group that passes through the magnetic ring.

5. The system applied to power line communication according to claim 1, wherein the at least one optimizer group comprises a plurality of optimizer groups and the power lines connected to either end of the at least one capacitor passes through the magnetic ring-comprise:
   a power line connected to a direct current output end of each optimizer group that passes through the magnetic ring.

6. The system applied to power line communication according to claim 1, wherein the at least one optimizer group comprises a plurality of optimizer groups and the power lines comprise:
   a power line connected to a direct current output end positive electrode of a first optimizer group; and
   a power line connected to a direct current electrode of a second optimizer group that passes through the magnetic ring, and the first optimizer group and the second optimizer group are two different optimizer groups in the plurality of optimizer groups.

* * * * *